(12) United States Patent
Fenkanyn et al.

(10) Patent No.: US 7,999,684 B2
(45) Date of Patent: Aug. 16, 2011

(54) RFID TIRE TAG TEST FIXTURE AND METHOD

(75) Inventors: John Michael Fenkanyn, Akron, OH (US); Rajat Jain, Lucknow (IN); Richard Nicholas Crano, Akron, OH (US); Dale Roy Norton, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 511 days.

(21) Appl. No.: 12/272,887

(22) Filed: Nov. 18, 2008

(65) Prior Publication Data

US 2010/0123585 A1    May 20, 2010

(51) Int. Cl.
*G08B 13/14* (2006.01)

(52) U.S. Cl. ............ 340/572.7; 340/572.8; 340/10.1; 340/5.61; 340/5.7; 340/442; 340/445; 340/447; 340/448; 235/375; 235/380; 235/382; 235/385; 235/492

(58) Field of Classification Search .......... 340/572.7, 340/572.8, 10.1, 5.61, 5.7, 442, 445, 447, 340/448; 235/375, 380, 382, 482, 498; 343/700 MS, 728, 742, 856, 867
See application file for complete search history.

(56) References Cited

U.S. PATENT DOCUMENTS

| | | | | |
|---|---|---|---|---|
| 7,102,499 | B2 * | 9/2006 | Myatt | 340/447 |
| 7,453,407 | B2 * | 11/2008 | Logan et al. | 343/711 |
| 2003/0221766 | A1 * | 12/2003 | Strache et al. | 156/123 |

* cited by examiner

*Primary Examiner* — Tai T Nguyen
(74) *Attorney, Agent, or Firm* — Richard B. O'Planick

(57) ABSTRACT

A test fixture and electronic tag assembly includes an electronic tag comprising an electronic device and a half wave dipole antenna of antenna length L. The antenna is configured as first and second coiled dipole antenna segments connecting with and extending in opposite directions from the electronic device. The assembly further includes a support frame; first and second electrically conductive pads positioned in spaced apart relationship within the support frame; and apparatus for fixedly holding end segments of the first and second coiled dipole antenna segments respectively against the first and second conductive pads in an overlapping relationship. A combined length of the first and second coiled dipole antenna segments and the conductive pads less the length of the overlapping end segments define a calculated effective antenna length for operative utility in performance measurement of the electronic tag in air analogous with the performance of the performance of the tag in a non-air medium such as in a tire. The spacing between the conductive pads may be selectively altered to accommodate the testing of tags of varying lengths within the fixture.

11 Claims, 9 Drawing Sheets

RFID TIRE TAG TEST FIXTURE AND METHOD

FIELD OF THE INVENTION

The invention relates generally to an RFID tag test fixture and method and, more specifically, a testing fixture and method for a RFID tire tag.

BACKGROUND OF THE INVENTION

RFID tags are incorporated into a range of products for the purpose of allowing an identification of the product by a remote reading device. It is important that tags of variable lengths and configurations be tested in order to verify that they are operating correctly within system specifications for the particular product and application for which they are intended. In addition, it is desirable to determine the minimum read and write power characteristics of the tag so that testing will provide a reliable quality control assessment. Furthermore, it is desirable to test the tags under controlled environmental conditions to improve the reliability and relevance of the test results.

SUMMARY OF THE INVENTION

According to an aspect of the invention, a test fixture and electronic tag assembly includes an electronic tag comprising an electronic device and a half wave dipole antenna of antenna length L. The antenna is configured as first and second coiled dipole antenna segments connecting with and extending in opposite directions from the electronic device. The assembly further includes a support frame; first and second electrically conductive pads positioned in spaced apart relationship within the support frame; and apparatus for fixedly holding end segments of the first and second coiled dipole antenna segments respectively against the first and second conductive pads in an overlapping relationship.

Pursuant to another aspect of the invention, a combined length of the first and second coiled dipole antenna segments and the conductive pads define a calculated effective antenna length for operative utility in performance measurement of the electronic tag in air. Verification of the minimum read and write power levels required by tags of varying lengths may be established.

In a further aspect, the retention apparatus comprises abutting first and second blocks defining a block cavity dimensioned and shaped for receipt of the electronic tag and conductive pads therein. The spacing between the conductive pads may be selectively altered to accommodate testing tags of varying lengths.

BRIEF DESCRIPTION OF THE DRAWINGS

The invention will be described by way of example and with reference to the accompanying drawings in which.

DETAILED DESCRIPTION OF THE INVENTION

Figure 1:
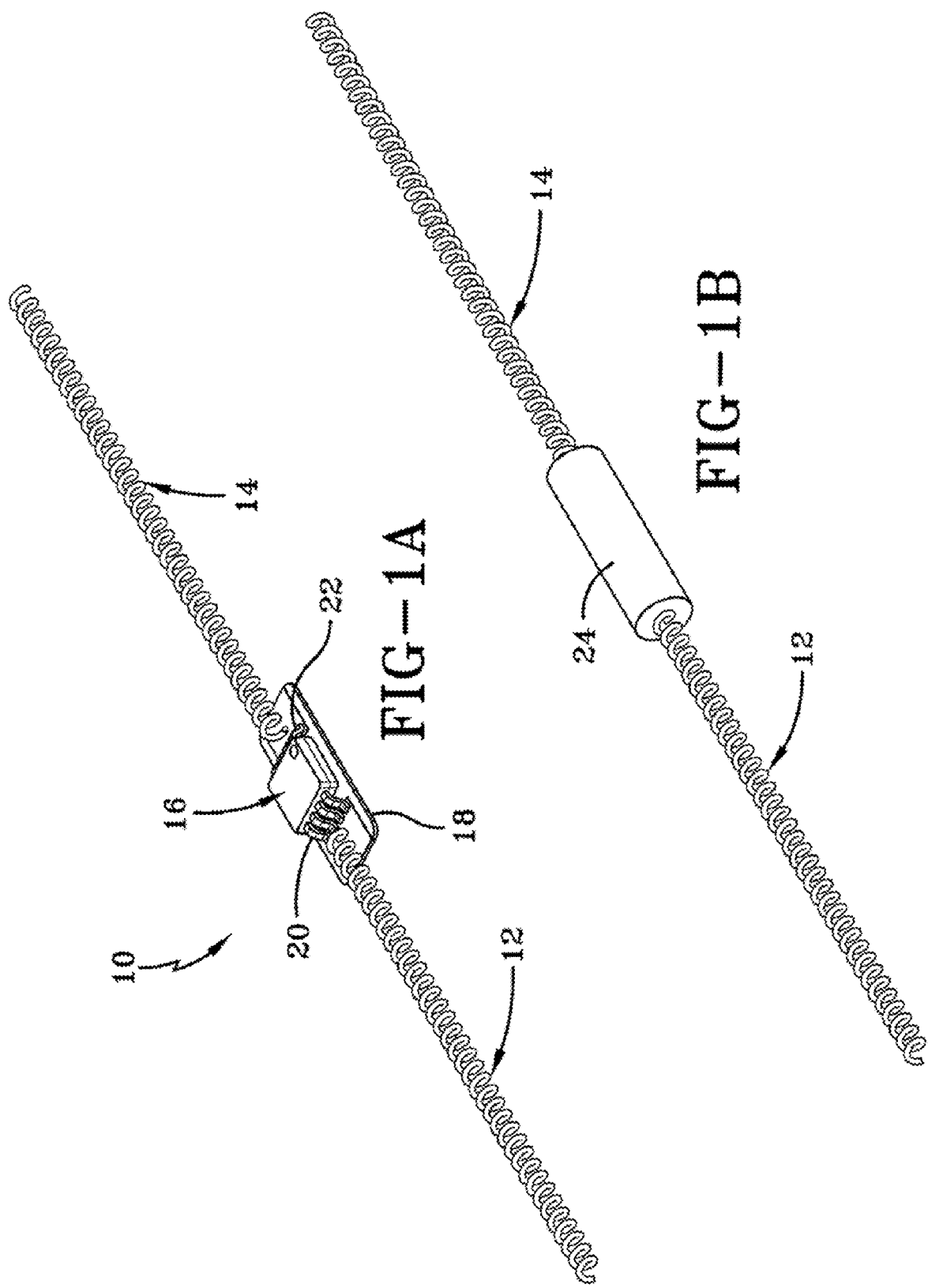
FIG. 1A is a perspective view of a tag assembly.
FIG. 1B is a perspective view of the tag in an encapsulating protective medium.
Figure 2:
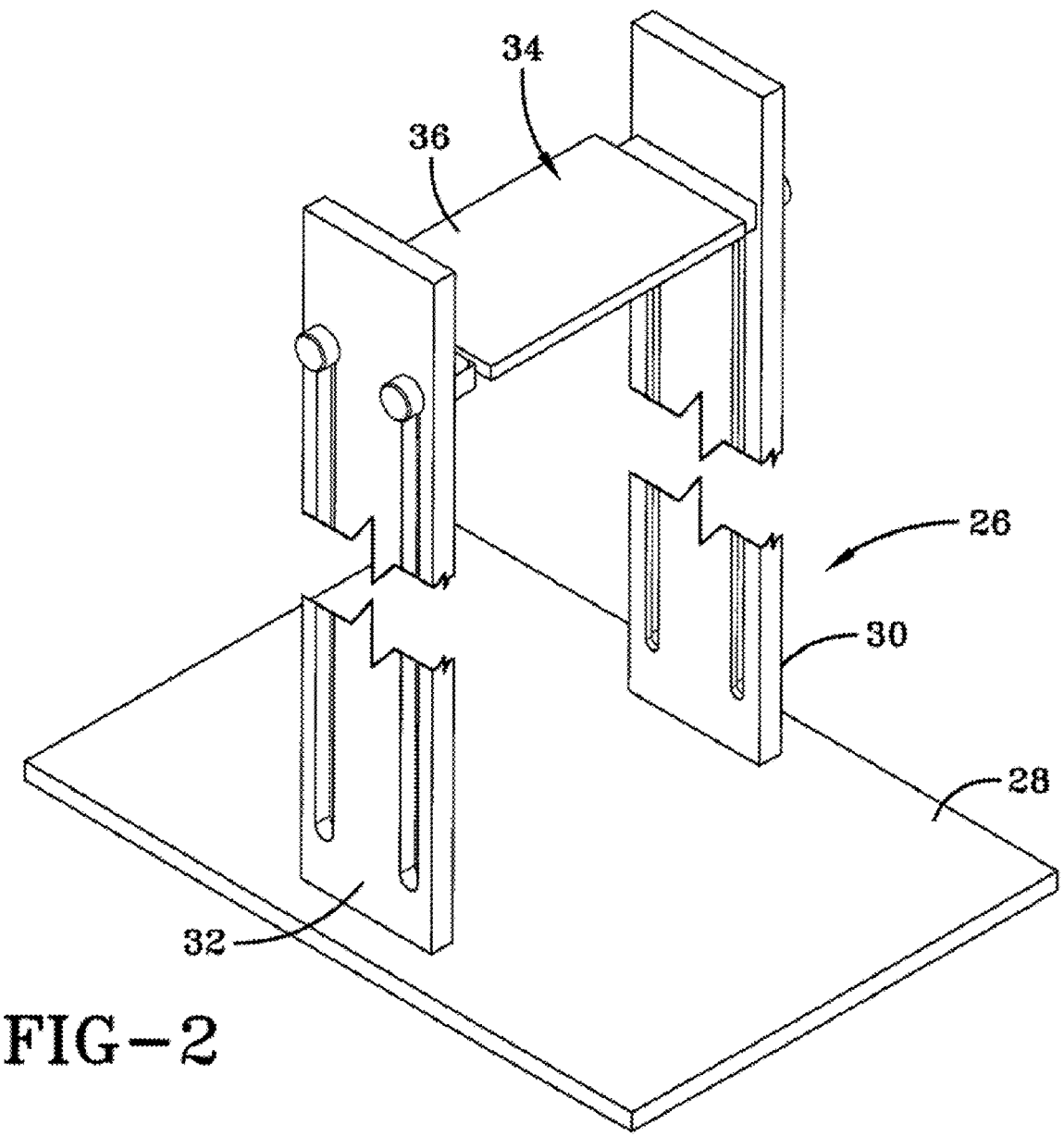
FIG. 2 is a perspective view of a support stand sub-assembly of the test fixture apparatus.
Figure 3:
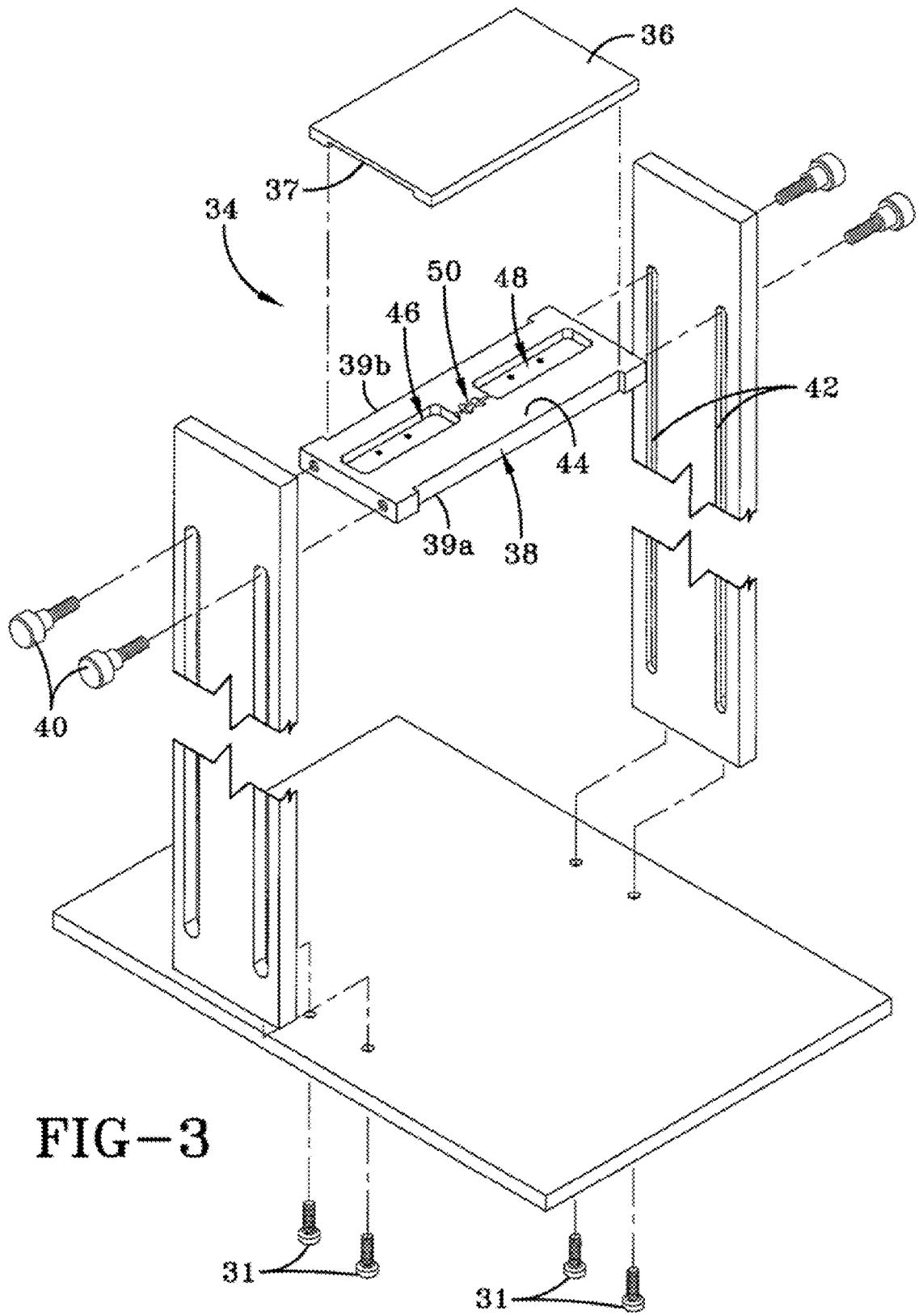
FIG. 3 is a partial exploded perspective view of the test fixture apparatus.
Figure 4:
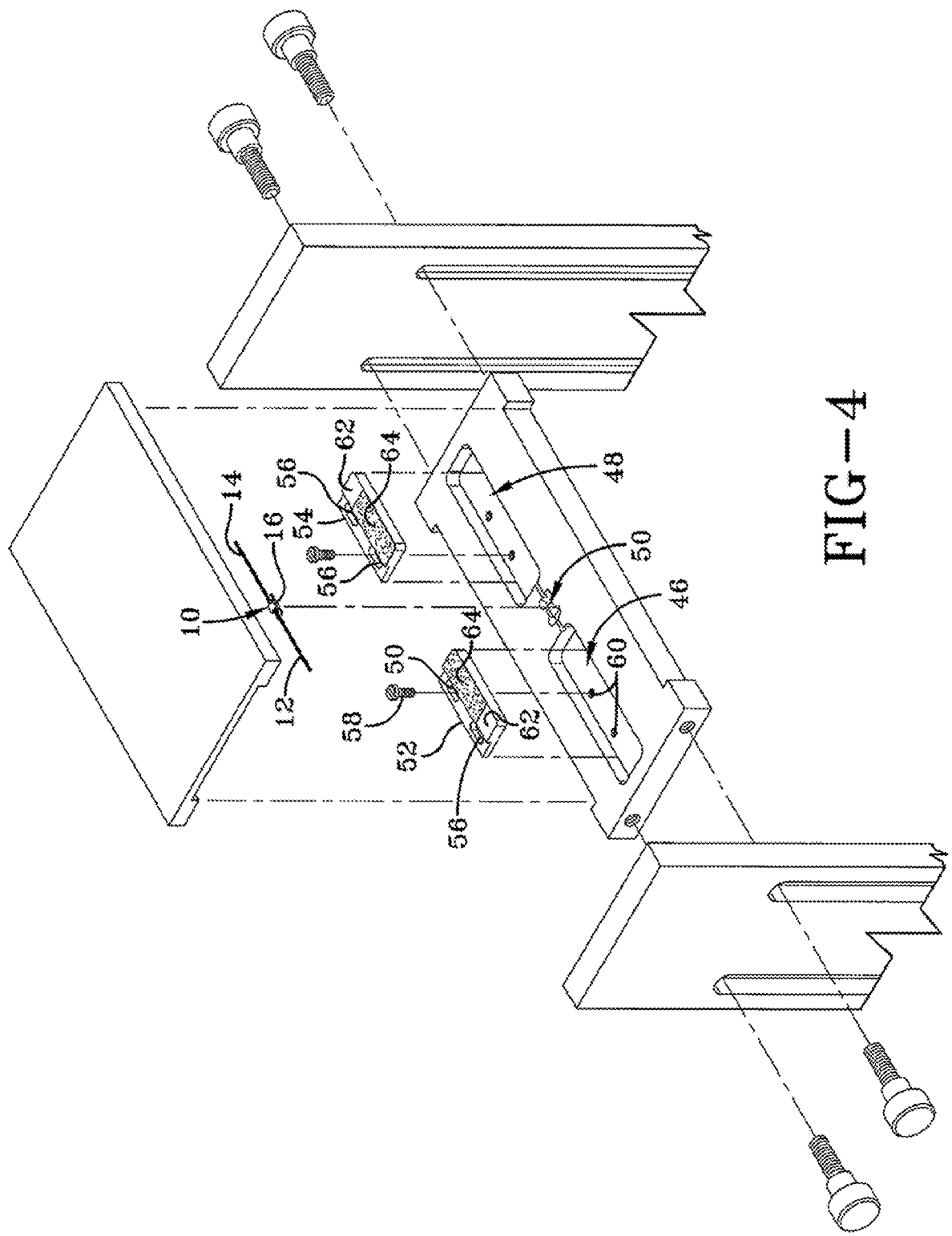
FIG. 4 is a partial exploded perspective view of an upper portion of the support stand
Figure 5:
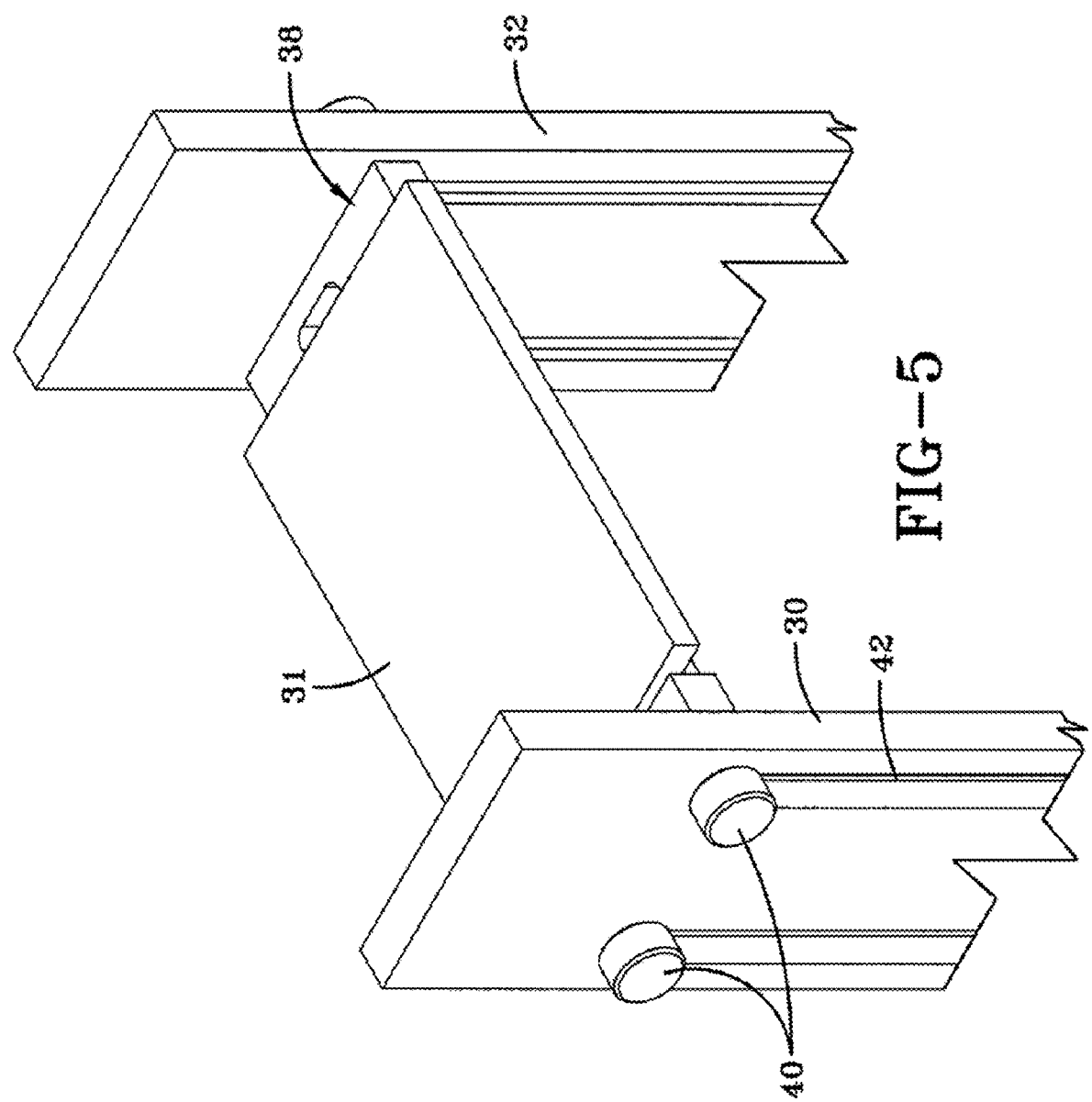
FIG. 5 is a partial perspective view of an upper portion of the support stand.
Figure 6:
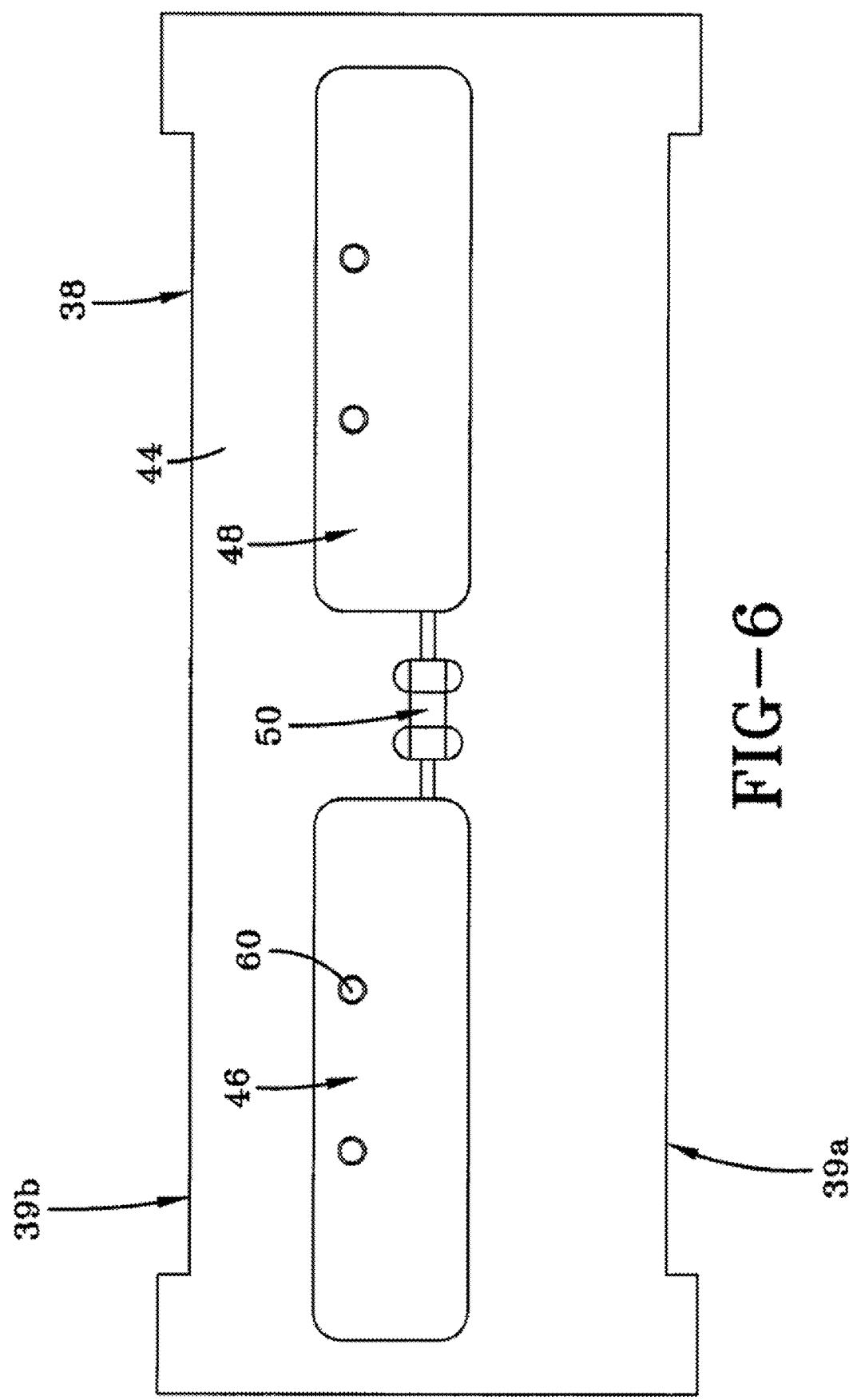
FIG. 6 is a top plan view of the tag support block component of the apparatus.
Figure 7A:
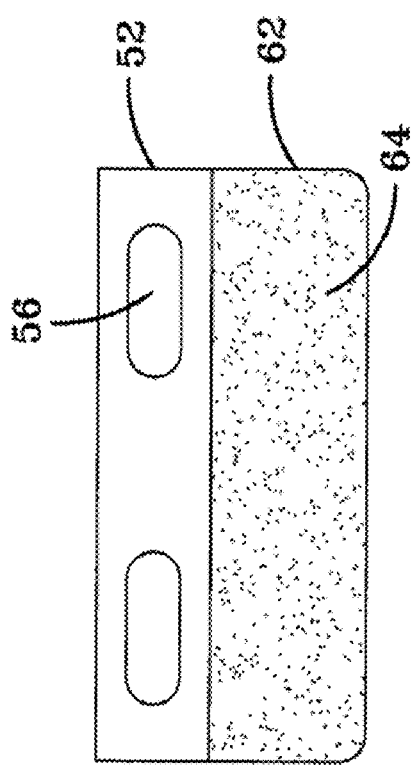
FIGS. 7A, 7B, and 7C are plan view of a substrate insert component of the apparatus showing alternative conductive pad schematic configurations.
Figure 7B:
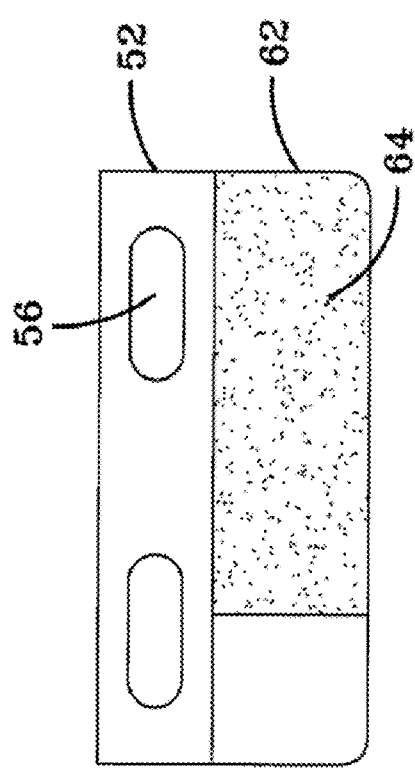
Figure 7C:
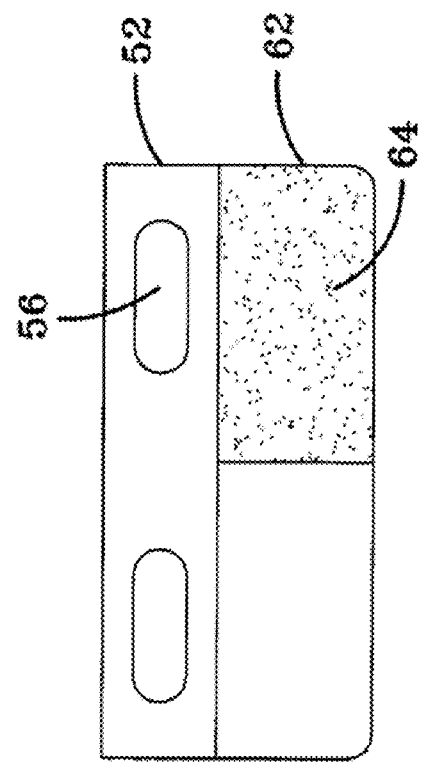

Referring first to FIGS. 1A and 1B, an electronic tire tag 10 is of a conventional commercially configured type and includes an antenna formed by a pair of coiled antenna segments 12, 14. An integrated circuit package (IC) 16 is mounted to a carrier substrate 18 and includes interconnection leads 20, 22 extending from opposite IC package sides respectively. The antenna 12, 14 is conventionally electrically connected to the IC leads 20, 22 and is suitably tuned to a predetermined radio frequency "f" substantially within a range of 902 to 928 MHz, for receiving RF signals, referred to herein as interrogation signals, from an external transceiver (not shown).

Operatively, the interrogation signal is received by the antenna 12, 14 from a remote transponder (not shown) and transmitted to the integrated circuitry within the package 16. The integrated circuit within the package 16 processes the RF interrogation signal into a power signal for powering a logic circuit that includes conventional ROM, RAM, or other known types of memory storage devices and circuitry. Data transmission from the storage devices is thereby enabled and stored data is transmitted by the antenna 12, 14 back to an external reader or transponder (not shown). The tag 10 may be incorporated within various products and utilized to communicate stored data relating to such products to the remote reading device.

The electronic tire tag 10 may be encapsulated in a rigid or semi-rigid material, such as a urethane, epoxy or polystyrene resin, hard rubber compound or the like in a configuration such as the cylindrical package 24 shown in FIG. 1B. Thereafter, the encapsulated electronic tire tag 10 is preferably wrapped with a suitable green rubber material (not shown) to form a green rubber patch (not shown) that is vulcanized and fixedly secured to a tire (not shown). Alternatively, the tag 10 may be incorporated within the green tire prior to tire cure.

Accordingly, the RFID tire tag must be tuned to rubber for efficient operation. However, testing (minimum read and minimum write power) the tag 10 within a rubber material is problematic. Placing the tag in close contact to cured rubber does not provide the optimal coupling method and as the cured rubber sample ages, the testing data may become unreliable. Also, in order to test RFID tire tags 10 with different antenna lengths, different sized rubber samples would need to be employed to accommodate the antenna length differences. Testing the tag 10 in air would, ordinarily, not achieve satisfactory and reliable results because the tag 10 is not tuned for air. That is, its length (and impedance) is designed to transmit in rubber and not air.

The subject invention varies the effective length (and consequently its impedance) of a tag antenna in a testing apparatus and methodology disclosed herein. By so doing, the RFID tag 10 may be tested in air yet yield results analogous to a rubber transmission test environment. The testing apparatus is shown in FIGS. 2-5. As shown, the apparatus includes a support from assembly 26 formed having a base 28, vertically extending spaced-apart legs 30, 32 affixed at one end to the base by suitable means such as bolts 31. A test fixture assembly 34 includes a cover member or block 36 having a cover cavity 37 within an underside. The block 36 may be formed of any suitably rigid material such as a thermoplastic resin. A holding plate or second block 38 is provided having indented sides 39 A, B. The holding plate or block 38 fits closely within the cover cavity 37 such that a bottom surface of the cover and a top surface 44 of the holding plate are in abutment. The holding plate attaches to vertical slots 42 extending along the upper spans of legs 30, 32 by suitable means such as bolts 40 whereby the holding plate 38 is vertically adjustable along the support legs 30, 32 to a preferred height. For example, a testing height for a tag 10 may place the tag at a level simulating a mounting location of the tag within a tire.

Within the upper plate surface 44 of the holding plate 38 are spaced apart, generally rectangular, cavities 46, 48 connected by a centrally disposed tag cavity 50. The tag cavity 50 has a geometric profile for receipt of the IC package 16 of tag 10 as will be explained. A pair of substrate insert bodies 52, 54 are further provided have a generally rectangular form dimensioned for close receipt within respective holding plate cavities 46, 48. Positioned within each substrate body 52, 54 are a pair of adjustment slots 56 that receive bolts 58. The bolts 58 extend through sockets 60 within the floor of the cavities 46, 48 to secure the substrate bodies within the holding plate cavities. Each substrate body 52, 54 is laterally repositionable within a respective holding plate cavity 46, 48 to the extent of the slots 56.

The substrate bodies 52, 54 each are preferably although not necessarily multi-level, having a raised shelf region 62 along one side of the body. The raised shelf region 62 of each body 52, 54 supports a conductive pad 64 that is affixed by appropriate means to a top surface of the shelf region. The conductive pad 64 connected to each substrate body 52, 54 may comprise a conductive plate member (not shown) of suitably conductive material. In the embodiment shown, the conductive pads 64 are formed by foil tape having a conductive copper metallic surface. The foil tape comprising the conductive pads is affixed by adhesive to the shelf region 62 of each body 52, 54. The coverage of the shelf region 62 may be varied as illustrated in the alternatively-sized pads of 7A, B, and C. The sizing of the pads 64 determines the extent to which the test fixture assembly can accommodate tags of varying sizes.

To conduct a test on a tag 10, the tag 10 is positioned over the holding plate 38 and loaded into the cavities 46, 48 and 50. So situated, as shown best by FIG. 8B, the coiled antenna segments 12, 14 of the tag 10 overlap the conductive pads 64 on substrate bodies 52, 54. It will be noted that the extent of overlap may differ from tag to tag, depending on the length of the antenna segments 12, 14 of a given tag and the position of the substrate bodies 52, 54 within the cavities 46, 48. Bodies 52, 54 may be adjusted laterally within and to the extent of slots 56 to alter the extent of overlap with the antenna segments 12, 14. The shape and size of the central cavity 50 is somewhat oversized to accommodate receipt of the IC package 16 of a range of tag devices.

The cover 36 is thereafter assembled upon the holding plate 38 to enclose the tag 10 within the cavities 46, 48, and 50 in a sandwich configuration. The tag 10 is thereby rendered relatively immobile for the testing procedure. The testing procedure includes sweeping the sandwiched tag 10 at varying power levels from a transmitting device (not shown) to determine the minimum read and write power characteristics of the tag. At the conclusion of the test procedure, the cover 36 is removed and tag 10 withdrawn.

Figure 8A:
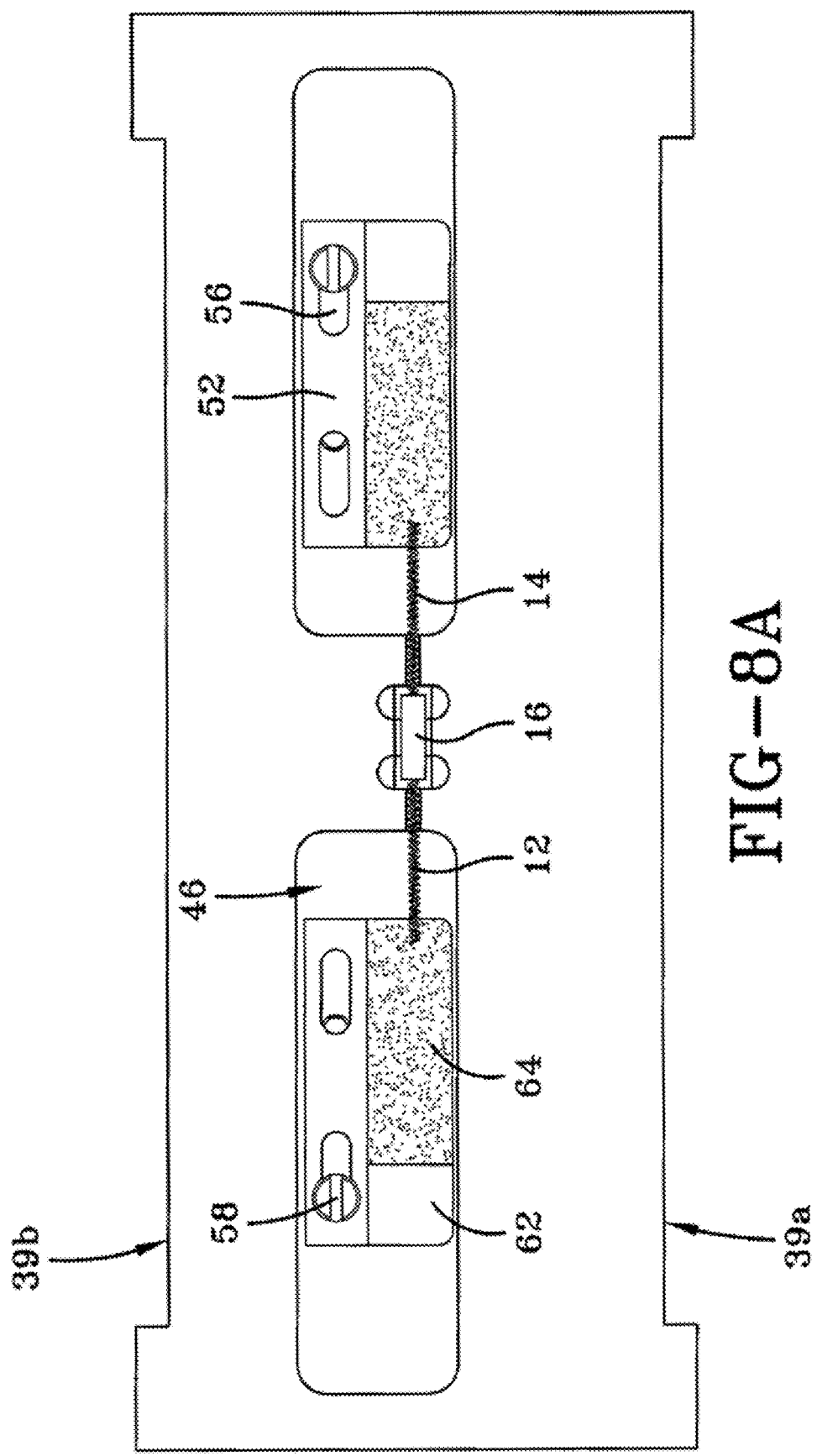
FIG. 8A is a top plan view of the tag support block and loaded tag with insert substrate components of the apparatus configured to provide a longer conductive pad extension to the tag antenna.
Figure 8B:
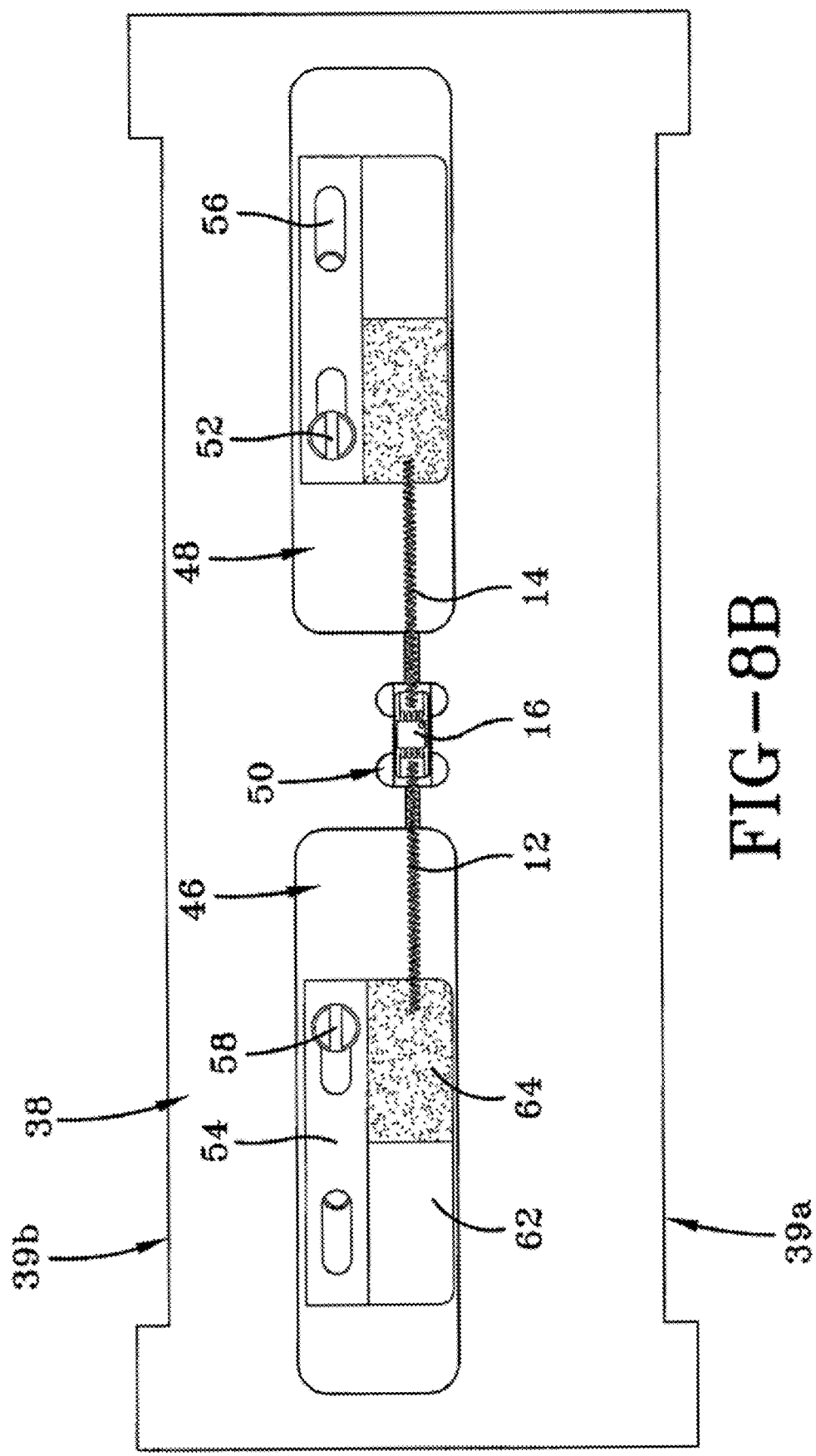
FIG. 8B is a top plan view of the tag support block and loaded tag with the insert components of the apparatus configured to provide comparatively shorter conductive pad extension to the tap antenna.

FIG. 8B shows the tag placed in the testing fixture assembly 34. The number of coils of the tag antenna touching the copper tape foil may be varied. The substrate inserts 52, 54 are screwed down by the screws 58 so that they do not shift during testing. The tag 10 for incorporation into a tire is designed such that the tag length and impedance are tuned to transmit in rubber. Testing the tag in a rubber medium, however, is difficult for the reasons previously explained. For the tag to be able to transmit in air, its effective length and consequently its impedance requires variation. The copper tape pads 64 on the inserts 52, 54 facilitate a variation to the length of the antenna of tag 10, as will be appreciated from the following example.

Since the antenna is a half-wave dipole antenna, its length can be computed according to the formula:

Length (L)=468/f (MHz) feet, where f=Frequency of transmission (for the subject example 902-928 MHz). Selecting a mean frequency of, as an example, 915 Hz, the effective length of the antenna was calculated to be 6.13 inches. A tag of approximately 3.1 inches in length was employed. The effective length of antenna represents the combination of conductive pad and tag length. Therefore, the conductive pad length required to total 6.13 inches is approximately 3.0 inches, or, 1.5 inches of conductive pad on either side within the testing fixture assembly. FIGS. 8A and 8B show the apparatus having conductive pads 64 of differing lengths, FIG. 8A pads being comparatively longer than those of FIG. 8B. The effective length of the antenna may be changed by sliding the substrates that carry the conductive pads within respective cavities 46, 48. Screws 58 within slots 56 are tightened when the requisite position required for the desired effective length of antenna is established.

From experimental results, it was concluded that the length of the copper tape affected the test results as the impedance of the tag varied with the length of the copper pad employed. Minimum power requirement at a range of test frequencies verified that the median and the mode nearly coincided and the standard deviation of the data was low, implying that the data obtained was accurate and precise. The testing of the tag in air utilizing the test fixture assembly 34 thus was concluded to be accurate.

The subject test fixture assembly 34 can accommodate different length tags. The copper foil taped pads 64 are laterally adjustable and may cover more or less of the surface area of the substrate inserts in order to accommodate a range of tag lengths. The pads act to extend the length of the antenna of the tag 10 to a requisite extent necessary to achieve a requisite effective antenna length. The testing assembly 34 eliminates the need for customized apparatus because tags of varying sizes and lengths may be accommodated. In addition, the assembly 34 eliminates the problem of testing an RFID tire tag in a rubber medium. Testing the tag within fixture assembly 34 and in air proved to be an accurate indicator that the tag 10 was performing according to predetermined minimum and maximum power criteria. Issues relating to testing within cured rubber and aging rubber accordingly may be avoided. The apparatus and assembly 34 thus provides a flexible fixture for testing tags having antenna segments of varied lengths by utilizing the conductive pads to extend the antenna length to a required extent. In addition, the sandwich configuration of the fixture assembly 34 acts to render a tag undergoing testing immoveable at a desired height for reliable and repeatable test results.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A test fixture and electronic tag assembly comprising:
   an electronic tag comprising an electronic device and a half wave dipole antenna of antenna length L, the antenna configured as first and second coiled dipole antenna segments connecting with and extending in opposite directions from the electronic device;
   a support frame;
   first and second electrically conductive pads positioned in spaced apart relationship within the support frame;
   retention means for fixedly holding end segments of the first and second coiled dipole antenna segments respectively against the first and second conductive pads in an at least a partially overlapping relationship; and repositioning means for selectively altering a spacing between the conductive pads.

2. The assembly of claim 1, wherein a combined length of the first and second coiled dipole antenna segments and the conductive pads define a calculated effective antenna length utilized to operatively evaluate electronic tag performance.

3. The assembly of claim 2, wherein the effective antenna length is greater than the length L.

4. The assembly of claim 1, wherein the retention means comprises abutting first and second blocks defining a block cavity dimensioned and shaped for receipt of the electronic tag and conductive pads therein.

5. The assembly of claim 4, wherein the conductive pads are each mounted to a respective support substrate mounted within the block cavity.

6. The assembly of claim 5, wherein at least one of the support substrates is repositionable within the block cavity to selectively alter the spacing between the conductive pads.

7. The assembly of claim 6, wherein the conductive pads are composed at least partially of metallic-foil tape.

8. The assembly of claim 1, wherein the retention means comprises abutting first and second blocks defining a block cavity dimensioned and shaped for receipt of the electronic tag and conductive pads therein, and wherein the conductive pads are each mounted to a respective support substrate mounted within the block cavity.

9. The assembly of claim 8, wherein at least one of the support substrates is repositionable within the block cavity to selectively alter the spacing between the conductive pads.

10. A test fixture and electronic tag assembly comprising:
    an electronic tag comprising an electronic device and a half wave dipole antenna of antenna length L, the antenna configured as first and second coiled dipole antenna segments connecting with and extending in opposite directions from the electronic device;
    a support frame assembly;
    first and second electrically conductive pads positioned in spaced apart relationship within the support frame assembly;
    retention means for fixedly holding end segments of the first and second coiled dipole antenna segments respectively against the first and second conductive pads in an at least a partially overlapping relationship; and
    adjustment means within the support frame for selectively altering a spacing between the conductive pads.

11. The assembly of claim 10, wherein a combined length of the first and second coiled dipole antenna segments and the conductive pads less the length of the overlapping end segments define a calculated effective antenna length for operative utility in performance measurement of the electronic tag air.

* * * * *